June 3, 1958  R. J. BAILEY  2,837,351
ELECTRICALLY INSULATED PIPE COUPLING WITH CONFINED
PRESSURE-SEALING MEANS
Filed Feb. 1, 1954
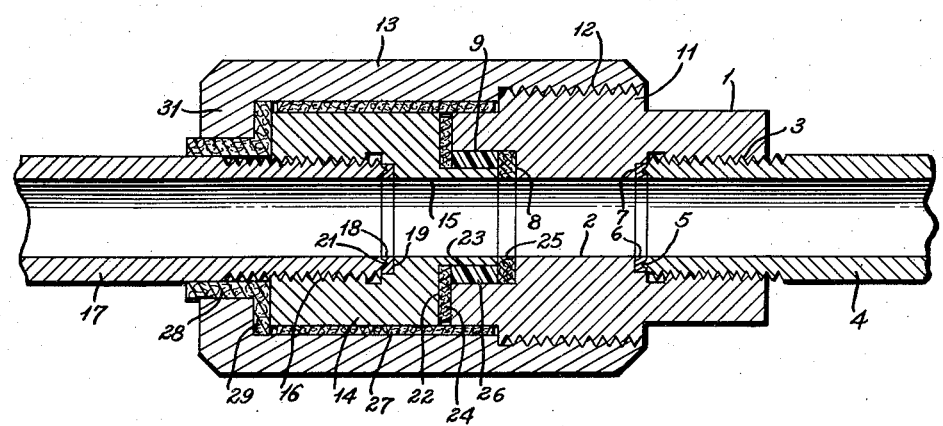

United States Patent Office 2,837,351
Patented June 3, 1958

2,837,351

ELECTRICALLY INSULATED PIPE COUPLING WITH CONFINED PRESSURE-SEALING MEANS

Richard J. Bailey, Chicago, Ill., assignor to Cardox Corporation, Chicago, Ill., a corporation of Illinois Application February 1, 1954, Serial No. 407,408

4 Claims. (Cl. 285—52)

This invention relates to new and useful improvements in metal pipe or tubing couplings, and the like, and deals more particularly with couplings which function to electrically insulate the connected pipe sections from each other.

It is the primary object of this invention to provide a pipe or tubing coupling which will electrically insulate the connected sections from each other.

A further important object of the invention is to provide an electrically insulated pipe or tubing coupling in which the insulation is so arranged as to withstand very high fluid pressures without leakage or damage to the insulation.

Other important objects and advantages of the invention will be apparent during the course of the following description.

In the accompanying drawing forming a part of this specification and in which like reference characters are employed to designate like parts throughout the same, The figure is a longitudinal sectional view of a coupling embodying the invention.

In the drawing wherein for the purpose of illustration is shown a preferred embodiment of this invention, reference character 1 designates a coupling member having a bore 2 therethrough. The outer end portion of the bore 2 is enlarged and internally threaded at 3 for receiving the threaded end portion of a section of pipe or tubing 4 which is advanced into the bore of the coupling member 1 to a position at which the ridge 5 on the end of the pipe or tubing is embedded in the gasket 6. The gasket 6 is thereby clamped between the end of the pipe or tubing 4 and the shoulder 7 formed in the bore 2 of the coupling member 1. The inner end portion of the coupling member 1 is internally rabbeted to provide an annular groove having a flat radial end wall 8 and a concentric, axially extending wall 9. The intermediate portion of the coupling member 1 is enlarged at 11 and is threaded at 12 for connection with clamping sleeve 13, as will be later described.

Arranged in end-to-end relationship with the coupling member 1 is a second coupling member 14 having a bore 15 extending axially therethrough. The outer end portion of the bore 15 is enlarged and threaded at 16 for connection with the threaded end portion of a section of pipe or tubing 17. The gasket 18 is clamped in sealing engagement between the shoulder 19 in the bore 15 and the ridge 21 on the end of the section of pipe or tubing 17. The inner end portion of the coupling member 14 is externally rabbeted to provide an annular groove having a flat radial end wall 22 and a concentric, axially extending wall 23. It will be noted that the diameter of the wall 23 is less than that of the wall 9 so that adjacent ends of the coupling members 2 and 14 may be telescoped with sufficient space remaining therebetween to receive the flat insulating washers 24 and 25 and the cylindrical insulating and sealing sleeve 26.

The insulating washer 25 is positioned in the inwardly opening radial space left between the radial surface at the extremity of the rabbeted end of the coupling member 14 and the opposed radial surface of the wall 8 of the rabbeted end of the coupling member 1. The insulating washer 24 is positioned in the radially outwardly opening space formed between the radial surface at the extremity of the rabbeted end of the coupling member 1 and the opposed radial surface of the wall 22 of the rabbeted end of the coupling member 14. Each of the washers 24 and 25 is formed of fibrous material which is capable of withstanding a very high compressive load without any substantial amount of deformation or other damage. The sleeve 26 is positioned between opposed circumferential surfaces of the axially extending walls 9 and 23 of the rabbeted ends of the coupling members 1 and 14, respectively. The sleeve 26 is formed of a plastic material that is capable of being urged into sealing engagement with the walls 9 and 23 by fluid pressure applied axially thereto. It will be noted that the sleeve 26 is completely confined between the walls 9 and 23 and the insulating washers 24 and 25 so that any pressure acting on the sleeve cannot extrude or force the sleeve in any way which would permit fluid to escape from the coupling. In other words, the load sustained by the sleeve 26 is substantially entirely due to the pressure of the fluid within the coupling members 1 and 14, and the sleeve is so confined that the pressure loading cannot cause the sleeve to be excessively deformed or otherwise damaged.

An insulating sleeve 27, formed of fibrous material, is positioned in surrounding relationship with the coupling member 14 and the overlapping end portion of the coupling member 1 and a flanged insulating bushing, formed of fibrous material, is positioned on the section of pipe or tubing 17 with its radially extending flange 29 engaging the outer end of the coupling member 14.

The coupling members 1 and 14 are rigidly clamped in the above described end-to-end relationship by the clamping sleeve 13 which is flanged at 31 to fit over and engage the insulating sleeve 27 and is threaded onto the enlarged portion 11 of the coupling member 1. The said flange 31 of the clamping sleeve extends radially inwardly into engagement with the outer surface of the insulating bushing 28 and its flange 29. Tightening of the threaded connection between the clamping sleeve 13 and the coupling member 1, therefore, causes the bushing flange 29, coupling member 14 and insulating washer 24 to be clamped between the inner end of the coupling member 1 and the clamping flange 31. The insulating washer 25 is clamped between the end of the coupling member 14 and the radial wall of the rabbeted end of the coupling member 1.

After the coupling members 1 and 14 have been rigidly connected to each other by the clamping sleeve 13, the entire coupling may be coated with a suitable water repellent material to prevent moisture from coming into contact with the fibrous insulating material.

It will be readily apparent that the coupling members 1 and 14 and their attached sections of pipe or tubing 4 and 17, respectively, are completely electrically insulated from each other by the washers 24 and 25, the sleeves 26 and 27, and the bushing 28. The arrangement of the above described insulating members will permit the pressure of any fluid confined in the coupling to be raised to a value of, for example, 10,000 pounds per square inch without deformation or other damage to the insulating members.

It is to be understood that the form of this invention herewith shown and described is to be taken as a preferred example of the same, and that various changes in the shape, size, and arrangement of parts may be resorted

Having thus described the invention, I claim:

1. A device of the type defined, comprising a first coupling member and a second coupling member arranged in end-to-end relationship and having correspondingly sized alined passageways therethrough with internally threaded outer end portions, the adjacent end portions of said first and second coupling members being internally and externally rabbeted, respectively, to provide flat end surfaces and arranged in axially overlapped relationship to provide longitudinally staggered inwardly and outwardly opening grooves between said flat end surfaces of said members and a cylindrical chamber between the bases of said grooves, a flat insulating washer formed of a material having high compressive strength positioned in each of said grooves, a cylindrical insulating and sealing sleeve positioned in said cylindrical chamber between said grooves and confined thereto by said insulating washers, said cylindrical sleeve being formed of a pressure deformable material capable of being urged into sealing engagement with the surfaces of said cylindrical chamber by fluid pressure applied axially to said sleeve, a clamping sleeve threadedly connected to one of said coupling members and extending axially therefrom in radially outwardly spaced relationship with the other of said members, said sleeve having an inwardly extending flange in axially spaced relationship with the outer end of said other of said members, and electrical insulating means between said sleeve and said other of said members and around the inner edge surface of said flange.

2. A device of the type defined, comprising a first coupling member and a second coupling member arranged in end-to-end relationship and having correspondingly sized alined passageways therethrough with internally threaded outer end portions, the adjacent end portions of said first and second coupling members being internally and externally rabbeted, respectively, to provide flat end surfaces and arranged in axially overlapped relationship to provide longitudinally staggered inwardly and outwardly opening grooves between the end surfaces of said members and a cylindrical chamber between the bases of said grooves, a flat insulating washer formed of a material having high compressive strength positioned in each of said grooves, a cylindrical insulating and sealing sleeve positioned in said cylindrical chamber between said grooves and confined thereto by said insulating washers, said cylindrical sleeve being formed of a pressure deformable material capable of being urged into sealing engagement with the surfaces of said cylindrical chamber by fluid pressure applied axially to said sleeve, a clamping sleeve threadedly connected to the radially outer surface of one of said coupling members and extending axially therefrom in radially outwardly spaced relationship with the other of said members, said clamping sleeve having an inwardly extending clamping flange in axially spaced relationship with the outer end of said other of said members, an insulating sleeve positioned between said clamping sleeve and the radially outer surface of said other of said members, and a flanged insulating bushing positioned between said clamping flange and the opposed outer end surface of said other of said members and extending across the inner edge surface of said flange.

3. A device of the type defined, comprising a pair of coupling members arranged in end-to-end relationship and having correspondingly sized alined bores with internally threaded outer end portions, the adjacent end portions of said members being telescoped and having two longitudinally spaced pairs of opposed flat radial surfaces and one pair of opposed circumferential surfaces, the surfaces of each of said pairs of opposed radial surfaces being spaced to provide annular chambers therebetween and said opposed circumferential surfaces being spaced to provide a cylindrical chamber therebetween, electrical insulating means formed of a material having a high compressive strength and positioned in the annular chamber between each of said pairs of radial surfaces, a cylindrical sealing and electrical insulating means completely confined in the cylindrical chamber between said pair of circumferential surfaces and said electrical insulating means, said cylindrical sealing and electrical insulating means being formed of a pressure deformable material capable of being urged into sealing engagement with said circumferential surfaces by fluid pressure applied axially thereto, a sleeve encircling one of said coupling members in radially spaced relationship and threadedly connected to the other of said coupling members, said sleeve having an inwardly extending flange in axially spaced and opposing relationship with the outer end of said encircled coupling member for compressing said electrical insulating means between the associated flat radial surfaces, and electrical insulating means filling the spaces between all of the opposed surfaces of said sleeve and encircled coupling member.

4. A device of the type defined, comprising a pair of coupling members arranged in end-to-end relationship and having correspondingly sized alined bores with internally threaded outer end portions, the adjacent end portions of said members being oppositely rabbeted to provide inwardly and outwardly opening grooves, the inside and outside dimensions, respectively, of said grooves being sufficiently different to permit telescoping of said end portions and to provide two longitudinally spaced pairs of opposed flat radial surfaces and one pair of opposed circumferential surfaces, the surfaces of each of said pairs of opposed radial surfaces being spaced to provide annular chambers therebetween and said opposed circumferential surfaces being spaced to provide a cylindrical chamber therebetween, flat electrical insulating washers of compression sustaining fibrous material positioned in the annular chamber between each of said pairs of radial surfaces, a cylindrical sealing and electrical insulating sleeve positioned in the cylindrical chamber between said circumferential surfaces and confined thereto by said insulating washers, said cylindrical sleeve being formed of a pressure deformable plastic material capable of being urged into sealing engagement with said circumferential surfaces by fluid pressure applied axially thereto, a sleeve encircling one of said coupling members in radially spaced relationship and threadedly connected to the other of said coupling members, said sleeve having an inwardly extending flange in axially spaced and opposing relationship with the outer end of said encircled coupling member, and electrical insulating means filling the spaces between all of the opposed surfaces of said sleeve and encircled coupling member.

References Cited in the file of this patent

UNITED STATES PATENTS

| 299,206 | Deaves | May 27, 1884 |
| 515,716 | Peeples | Feb. 27, 1894 |
| 595,338 | Parkin | Dec. 14, 1897 |
| 764,603 | Lambert | July 12, 1904 |
| 1,455,971 | Rickenbacker et al. | May 22, 1923 |
| 2,653,834 | Purkhiser | Sept. 29, 1953 |

FOREIGN PATENTS

| 89,677 | Switzerland | Sept. 15, 1920 |
| 31,811 | France | Feb. 22, 1927 |
| 1,047,939 | France | July 29, 1953 |